United States Patent [19]

Barlow et al.

[11] Patent Number: 4,946,249

[45] Date of Patent: Aug. 7, 1990

[54] FIBER OPTIC SPLICE ASSEMBLY

[75] Inventors: Robert W. Barlow, Canton; Thomas M. Lynch; Steven E. Swanson, both of Williamsport, all of Pa.

[73] Assignee: GET Products Corporation, Stamford, Conn.

[21] Appl. No.: 415,812

[22] Filed: Oct. 2, 1989

Related U.S. Application Data

[63] Continuation-in-part of Ser. No. 403,438, Sep. 5, 1989.

[51] Int. Cl.[5] ............................................. G02B 6/38
[52] U.S. Cl. .............................. 350/96.21; 350/96.20; 350/96.2 B
[58] Field of Search ............... 350/96.20, 96.21, 96.22, 350/96.23

[56] References Cited

U.S. PATENT DOCUMENTS

| | | | |
|---|---|---|---|
| 4,676,589 | 6/1987 | Niyeshita et al. | 350/96.21 |
| 4,717,233 | 1/1988 | Szkaradnit | 350/96.21 |
| 4,717,234 | 1/1988 | Barlow et al. | 350/96.21 |
| 4,822,131 | 4/1989 | Anderson | 350/96.21 |

FOREIGN PATENT DOCUMENTS 3704789 8/1988 Fed. Rep. of Germany ... 350/96.21

Primary Examiner—John D. Lee
Assistant Examiner—Phan T. Heartney
Attorney, Agent, or Firm—William H. McNeill

[57] ABSTRACT

A fiber optic splicing system for accommodating optical fibers having similar or distinctly different buffered coating sizes. The system comprises a first pair of housing halves forming a body with opposed ends adapted to receive two optical fiber of a first similar size; a second pair of housing halves forming a body with opposed ends adapted to receive two optical fibers of a second similar size, different from said first size; and a third pair of housing halves forming a body having one end formed to receive one of said first size of optical fiber and another end formed to receive one of said second, different size of optical fiber. Holding means in the form of slidable end caps cooperate with the ends of the housing to apply radial compression thereto to maintain the fibers in position without the use of crimps or adhesives. A center portion of the halves can be formed to accept elastic means for receiving fibers or, alternatively, a hollow sleeve which includes the elastic means therein.

3 Claims, 8 Drawing Sheets

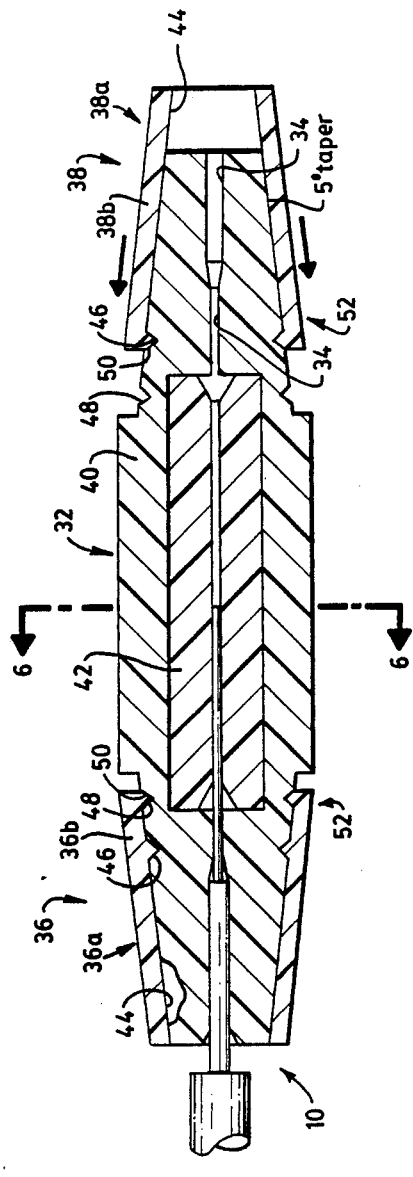
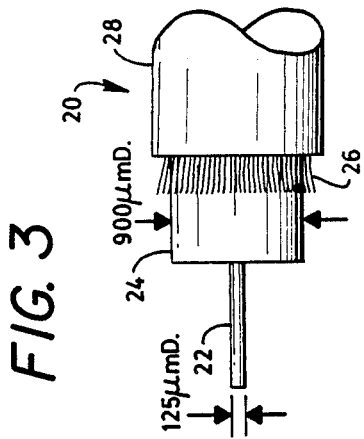
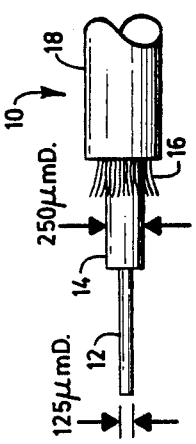
FIG. 3
FIG. 2
FIG. 1

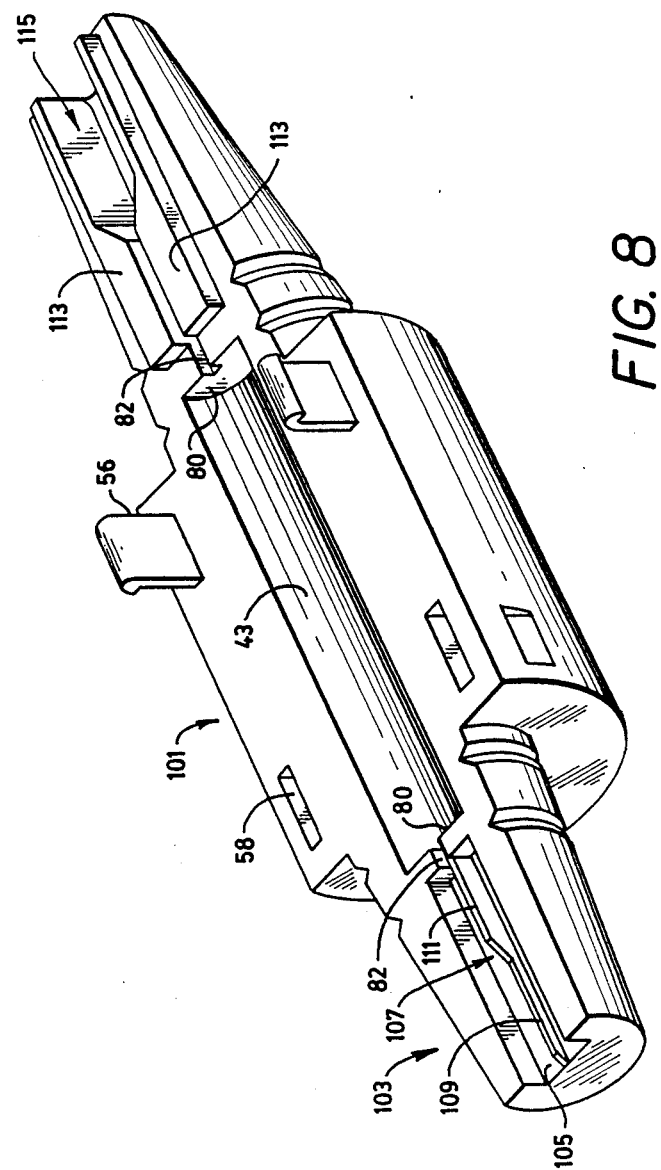

ic Splice Assembly

FIBER OPTIC SPLICE ASSEMBLY

CROSS-REFERENCE TO RELATED APPLICATION

This application is a continuation-in-part of pending application Ser. No. 07/403,438, filed Sept. 5, 1989, and assigned to the assignee of the present invention.

TECHNICAL FIELD

This invention relates to fiber optic splice assemblies. More particularly, it relates to such splice assemblies which are reuseable and which hold mated fibers in position without the agency of any additional bonding material. Further, it relates to splice assemblies which are adaptable to different sizes of fibers and are easy to assemble.

BACKGROUND ART

The joining of optical fibers for use in transmission lines frequently requires the use of a splice. Common techniques employed in the industry include mechanical splices as exemplified in U.S. Pat. Nos. 4,257,674; 4,832,440; and 4,824,198 all being assigned to the assignee of the instant invention; U.S. Pat. Nos. 4,818,055; 4,818,058; 4,818,059; 4,818,061; 4,707,068; 4,548,467; 4,573,760; 4,755,018; 4,787,701; fusion splicing, which literally involves melting the fibers to be joined together until they fuse, as shown, e.g., in U.S. Pat. No. 4,118,618; and connectorization, as shown, e.g., in the following U.S. Pat. Nos. 3,579,316; 3,734,594; 3,825,319; 3,861,781; 3,870,395; 3,919,037; 3,944,328; 4,061,416; 4,107,242; 4,166,668; 4,186,998; 4,787,704. Also known are commercially available connectors such as the FC; BICONIC; SMA 905 and 906; ST*; D4; and FC-PC. (*Note; ST is a registered trademark of AT&T).

The typical mechanical splice is not reuseable since its employment requires that the fiber be cemented therein, usually by the use of an optial adhesive. Fusion splicing is expensive and time consuming and is generally not suited for emergency field use. The connector approach is well suited for joining fibers to equipment which has mating terminals but is also not suited for emergency repairs. The remateable splice shown in U.S. Pat. No. 4,787,704 is complex and expensive, and the remateable splice shown in application Ser. No. 07/305,350, (U.S. Pat. No. 4,929,046) which is assigned to the assignee of the present invention, requires the use of set screws and, thus, a screw driver. Other types, such as those shown in the above-recited '055 patent, apply uneven compressive forces to the fibers and, further, require that both fibers be spliced simultaneously..

SUMMARY OF THE INVENTION

It is, therefore, an object of this invention to obviate the disadvantages of the prior art.

It is another object of the invention to enhance fiber optic splices.

Yet another object of the invention is the provision of a reuseable splice.

Still another object of the invention is the provision of a splicing system which will accommodate differences in fiber sizes.

Yet another object of the invention is the provision of a fiber optic splice that applies even pressure thereto in a radial manner.

An additional object includes a splice having provision for applying presure on both the bare glass and the buffer coating of an optic fiber.

Yet another object is the provision of a remateable splice wherein one fiber at a time may be fixed in position.

These objects are accomplished, in one aspect of the invention, by the provision of a fiber optic splice assembly for splicing optical fibers wherein the fibers have a transparent core with a buffer coating thereon. The assembly comprises a longitudinal body having an axial bore therethrough and opposed ends separated by and connected to a center portion. An elastic means is provided in the center portion for receiving the transparent cores of two fibers which have had a portion of their buffer coating removed, one fiber entering said body from each of the ends. Means associated internally of the ends receive a portion of the fibers having a buffer coating thereon. Holding means cooperate with the ends for applying radial compression thereto whereby the fibers are retained within the assembly.

Thus, there is provided a splice assembly which is simple to use, especially in closed environments such as the confines of a man-hole. It is reuseable and applies pressure to the fiber in a very even, circumferential manner. Further, the pressure is applied both to the fiber and its buffer coating.

BRIEF DESCRIPTION OF THE DRAWINGS

FIG. 1 is an elevational view of a first optical fiber which can be utilized with the invention;

FIG. 2 is an elevational view of a second optical fiber which can be utilized with the invention;

FIG. 3 is an elevational, cross-sectional view of an assembly in accordance with an embodiment of the invention;

FIG. 8 is a similar view of an accompanying half for use with the half of FIG. 7;

BEST MODE FOR CARRYING OUT THE INVENTION

Figure 4:
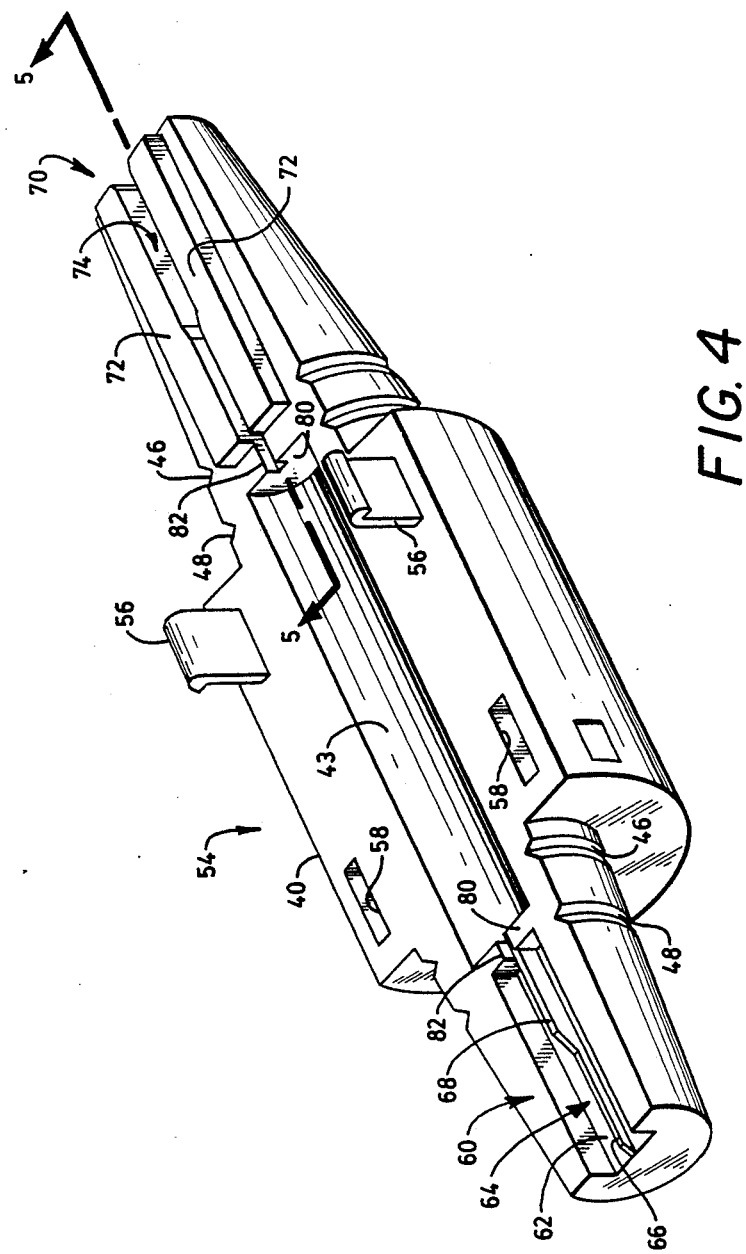
FIG. 4 is a perspective view of one half of the assembly of FIG. 3.

For a better understanding of the present invention, together with other and further objects, advantages and capabilities thereof, reference is made to the following disclosure and appended claims taken in conjunction with the above-described drawings.

Referring now to the drawings with greater particularity, there is shown in FIGS. 1 and 2 two of the more commonly used sizes of optical fiber. In FIG. 1 the optical fiber 10 has a transparent core 12 having a diameter of 125 um with a buffer coating 14 thereon which has a diameter of 250 um. A strength material 16, such as Kevlar, may overlie the buffer coating and an outside coating 18 can complete the package. The optical fiber 20 shown in FIG. 2 has a transparent core 22 having a diameter of 125 um, a buffer coating 24 having a diameter of 900 um, and a strength member 26, and outside coating 28. Thus, it will be seen that the major difference between the fibers 10 and 20, in so far as splicing them together is concerned, lies in the thickness of the buffer coating. The importance of this distinction will become apparent hereinafter.

Figure 6:
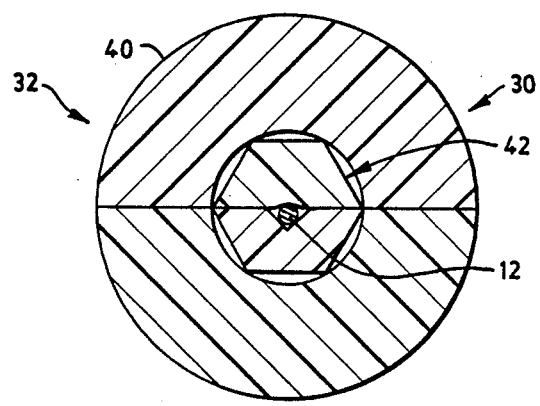
FIG. 6 is a sectional view taken along the line 6—6 of FIG. 3.

Referring now to FIG. 3 there is shown a fiber optic splice assembly 30 which comprises a longitudinal body 32 having an axial bore 34 therethrough. The body 32 has opposed ends 36 and 38 separated by and connected to a center protion 40 and preferably is made from a plastic material such as Vectra A625. Elastic means 42 is provided in a cavity 43 in the center portion and preferably comprises a pair of elastomeric halves as shown in U.S. Pat. No. 4,257,674, the teachings of which are hereby incorporated herein by reference. A cross-sectional view of the elastic means 42 is presented in FIG. 6.

Holding means 36a and 38a are associated with the ends 36 and 38 respectively, and cooperate therewith to apply radial, circumferential compression to the ends to retain fibers therein.

The ends 36, 38 are frusto-conical and the holding means comprise end caps 36b, 38b which fit over the ends and which have a frusto-conical, internal bore 44. Each of the ends 36, 38, is provided with first and second annular, external grooves 46, 48 respectively which sequentially engage an annular, internal flange 50 formed on the leading edge 52 of the end caps and are preferably made from a plastic material such as Fluoromelt FP-EC-1004.

The body 32 is formed from longitudinal, hermaphroditic halves 54, such as is shown in FIG. 4. The halves 54 are provided with projecting latches 56 on one end of the center portion 40 and with receiving slots 58 on the other end of the center portion. A pair of halves, one being rotated 180 degrees with respect to the other, and having the latches of one half engaged with the slots of the other half, provides a preliminary assembly. An end cap 36b is fitted over end 36 and an end cap 38b is fitted over end 38, in each instance with the flange 50 engaged in first annular groove 46. In this configuration the end caps are retained on the ends in a manner of allow handling and shipping. It is this configuration that could be supplied to the customer. To use the splice assembly, the user would prepare an optical fiber leaving an appropriate length of bare fiber and an appropriate length of buffer coating and insert the terminal portions thereof into the splice assembly 30 until the respective fibers meet substantially in the middle of the assembly. To simplify this procedure, the end caps can be provided with a marked gauge to indicate the appropriate trim length. With the splice optimized, for example by employing a local injection detection system, the end caps are pushed toward the center 40 until the flanges 50 engage the second annular grooves 48. In this position a constant, radial and circumferential compression is applied to the fiber and the buffer coating to consummate the splice. FIG. 3 illustrates an assembly wherein the left-hand side has an optical fiber inserted and end cap 36b in its final position, while the right-hand side has the end cap 38b still in its preliminary position with flange 50 in the first annular groove 46 and with no fiber yet in place.

Figure 5:
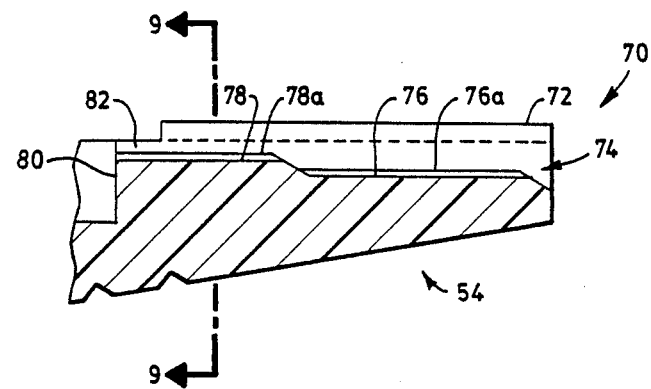
FIG. 5 is a partial, elevational, sectional view taken along the line 5—5 of FIG. 4.

Referring now to FIGS. 4 and 5, the internal construction of the hermaphroditic halves 54 will be exemplified. One of the internal ends is provided with a female section 60 comprised of a rectangular slot 62 having centrally located therein a raised rib 64 having a first sector 66 and a second sector 68. The other end is provided with a male section 70 comprised of a pair of raised pads 72 defining therebetween a gap 74. The bottom of the gap (see FIG. 5) has a first sector 76 and a second sector 78, both of which are provided with a V groove 76a and 78a for receiving a fiber. The rib 64 has a flat surface for engaging the fiber, thus providing a receptacle similar to that shown in U.S. Pat. No. 4,257,674.

When two halves 54 are joined together the pads 72 fit within the rectangular slot 62 and the oppositely disposed rib 64 and botton of gap 74 with its V groove, define therebetween the axial bore 32 for receiving the optical fiber; i.e., the buffer coating is received between 66 and 76 and the core 12 is received between 68 and 78. End walls 80 are each provided with a slot 82 for receiving the core 12 and leading it into elastic means 42.

As will be appreciated when dealig with hermaphroditic halves, each pair will receive a single size fiber. Thus, when one is working with fibers 10 and fibers 20, two specific designs will be necessary; however, the only difference between the two modifications will be in the dimensions of the gap 74 and the width of rib 66, which will have to accommodate the different sizes of the buffer coatings.

Figure 7:
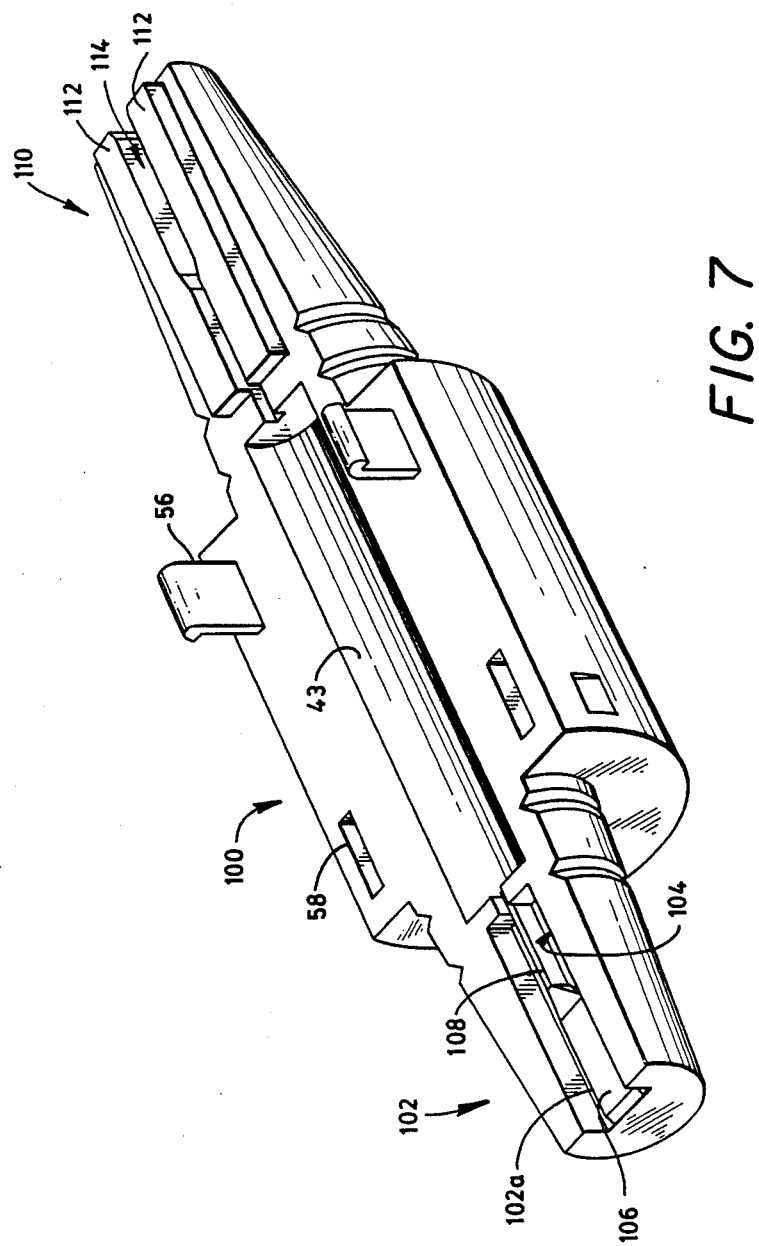
FIG. 7 is a perspective view of one half of an alternate assembly.

In order to provide a system that is all inclusive, i.e., a single system that will also allow the mating of a fiber 10 to a fiber 20, it is necessary to provide an additional pair of body halves that are not hermaphroditic. These halves are shown in FIGS. 7 and 8. A first of these halves, 100, has a large internal female end 102 comprising a rectangular slot 102a having an upstanding, centrally located rib 104 therein. The rib is provided with a first sector 106 and a second sector 108. The second sector 108 is identical to sector 68; however, sector 106 is much wider to accommodate the larger diameter buffer coating of fiber 20.

The opposite end is provided with a small internal male configuration 110 having raised pads 112 defining a gap 114 therebetween. The bottom of the gap 114 is the same as the bottom of gap 74, since it designed to take a fiber 10.

The mating half 101 shown in FIG. 8 has a small internal female end 103 having a rectangular slot 105 with a raised rib 107 which includes sectors 109 and 111. The opposite end is provided with a large internal male end comprised of pads 113 defining a gap 115 therebetween. The bottom of the gap is configured to receive a fiber 20; i.e., it looks like the reverse of rib 104, including the appropriately dimensioned V groove.

Accordingly, upon assembly of half 100 with half 101, the latches 56 engage respective slots 58 and pads 113 of half 101 enter rectangular slot 102a of half 100. Likewise, pads 112 enter rectangular slot 105. Pads 112 and slot 105 thus form the receiving port for a fiber 10, while pads 113 and slot 102a form the receiving port for fiber 20. Of course, before the halves are joined together, the elastic means 42 are placed in cavity 43, with an approproate index matching gel therebetween.

This system of splicing assemblies provides simplified manufacture and construction. No crimps are required to maintain the splice, thus, it is reuseable. The optical throughput can be verified and optimized, for example, by utilizing a local injection detection system. No adhesives are required and reliable field assembly is achievable without special fixtures or tools. Further, the splice can be accomplished one fiber at a time.

Figure 10:
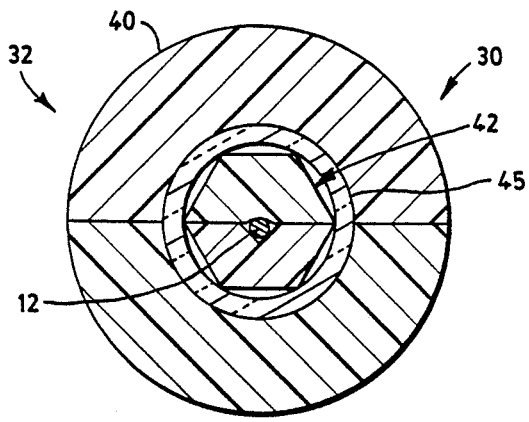
FIG. 10 is a sectional view similar to FIG. 6 showing an alternate embodiment of the invention.

In an alternate embodiment of the invention (see FIG. 10), the cavity 43 can be enlarged to accept a hollow sleeve 45 which can have the elastic means 42 mounted therein. The fiber receiving groove in the elastic means can be provided with a suitable index matching gel. Employment of tthe hollow sleeve, which can be glass, greatly simplifies the assembly of the splice. Enclosing the elastic means in a hollow sleeve is shown in the afore-mentioned U.S. Pat. No. 4,257,674.

Figure 11:
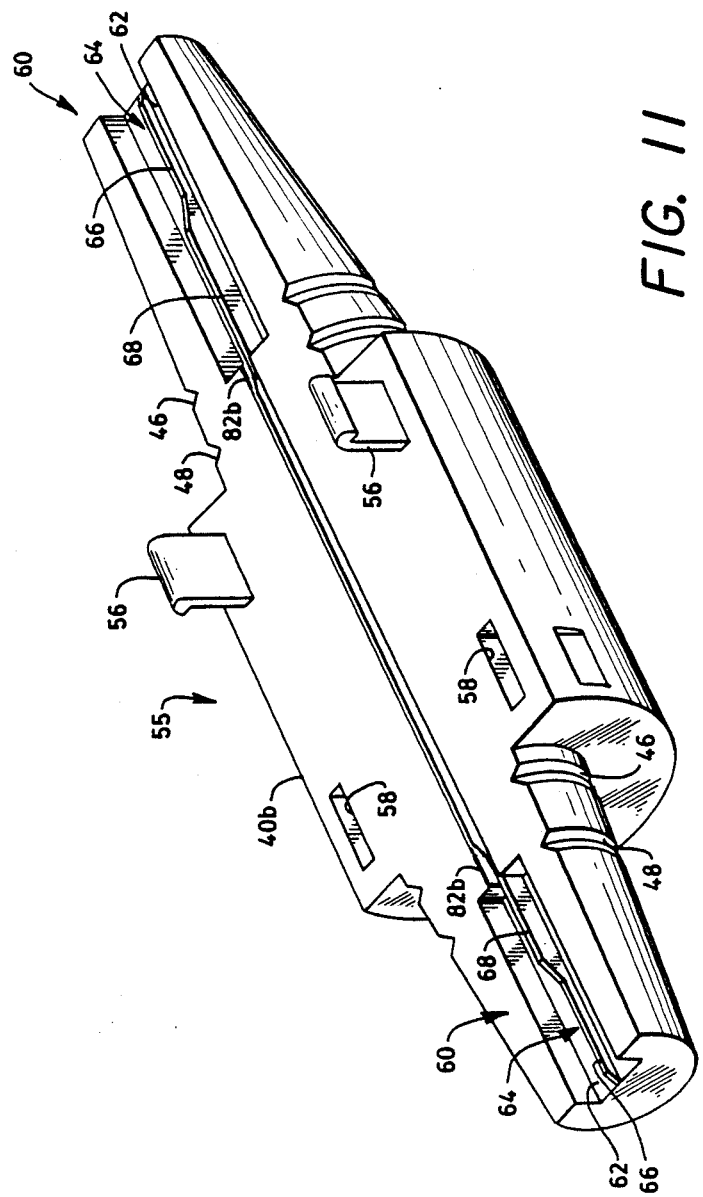
FIG. 11 is a perspective view similar to FIG. 4 illustrating an alternate embodiment of the invention.
Figure 12:
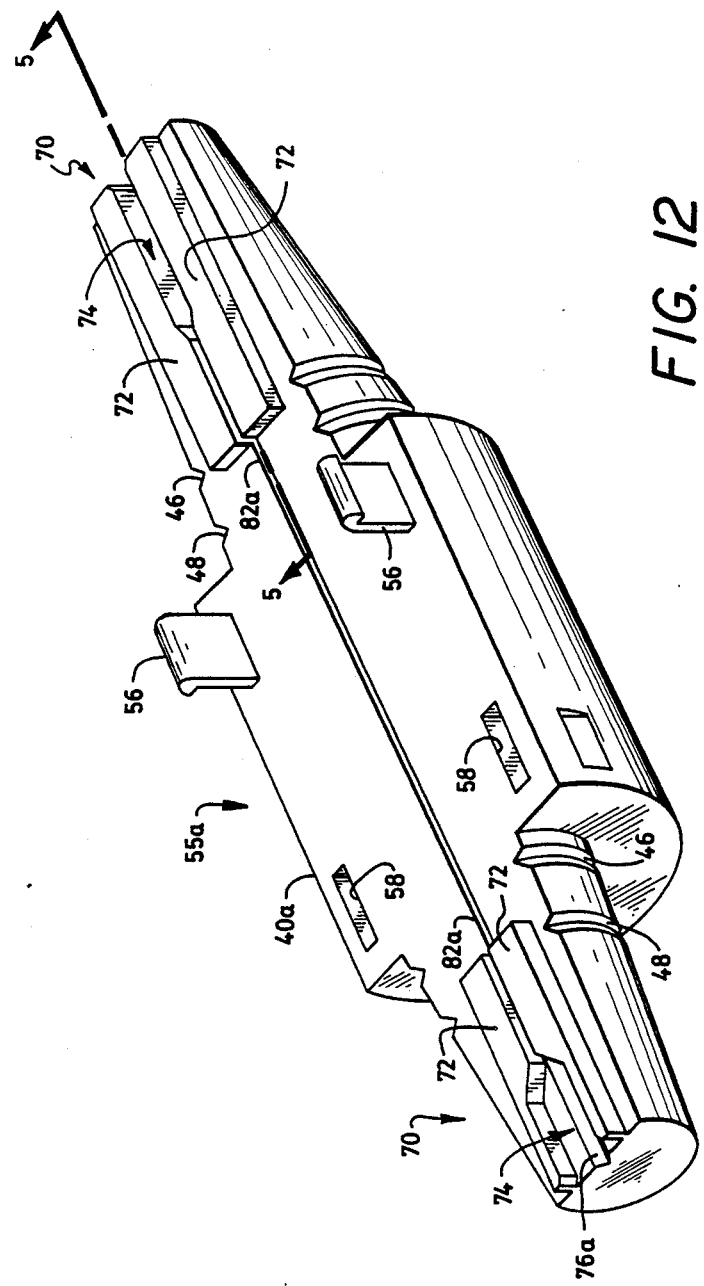
FIG. 12 is a perspective view similar to FIG. 5 illustrating the other half to the assebly of FIG. 11.

In yet another embodiment of the invention, there is shown in FIGS. 11 and 12 a system of non-hermaphroditic assembly halves.

Figure 9:
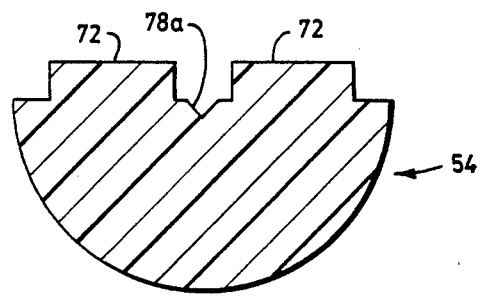
FIG. 9 is a sectional view taken along the line 9—9 of FIG. 5.

Referring specifically to FIG. 11, there is illustrated a female assembly half 55. Both of the internal ends are provided with a female section 60 comprised of a rectangular slot 62 having centrally located therein a raised rib 64 having a first sector 66 and a second sector 68. The male half 55a (see FIG. 12) has each end provided with a male section 70 comprised of a pair of raised pads 72 defining therebetween a gap 74. The bottom of the gap (see FIG. 5) has a first sector 76 and a second sector 78, both of which are provided with a V groove 76a and 78a for receiving a fiber. The V groove is shown in section iin FIG. 9. The rib 64 has a flat surface for engaging the fiber. The solid central portion 40a of the male half 55a is provided with a V groove 82a while the solid central portion 40b of the female half 55 is provided with a miniscule slot 82b. The transparent core 12 or 22 of a fiber 10 or 20 is received within the groove 82a and slot 82b. Alignment of the fibers actually occurs due to cold flow of the material around the fibers. Not only does this cold flow provide precision alignment, but it adds to the retention, also.

As will be readily apparent from the above description, each different fiber size will require its own specially constructed halves, the main differences being that the male and female ends be adapted to the appropriate size fiber.

While there have been shown what are at present considered to be the preferred embodiments of the invention, it will be apparent to those skilled in the art that various changes and modifications can be made herein without departing from the scope of the invention as defined by the appended claims.

We claim:

1. A fiber optic splice assembly for splicing optical fibers, said fibers having a transparent core and a buffer coating thereon, said assembly comprising; a longitudinal body having a male half and a female half, each half having ends and a central portion, said female half having internal portions of said female ends, each of said internal female ends being formed with a rectangular slot having a centrally located, raised rib therein and a miniscule slot through said central portion and connecting said raised ribs; each end of said male half having internal portions of said male ends which are formed to provide raised, rectangular pads for mating engagement with said rectangular slots, said pads defining therebetween a gap which corresponds in mating configuration to said raised ribs, said gap having the botton thereof provided with a V groove for receiving said fiber; and a V groove extending the length of said central portion of said male half and joining said gaps.

2. The fiber optic splice assembly of claim 1 wherein said ends are frusto-conical and said holding means comprise end caps which fit over said ends, said end caps having an internal bore which is frusto-conical.

3. The fiber optic splice assembly of claim 2 wherein each of said ends is provided with a first and second annular external groove and said end caps are each provided with an annular, internal flange formed to sequentially engage said first groove in a non-pressure applying manner and said second groove in a radial pressure supply mode.

* * * * *

UNITED STATES PATENT AND TRADEMARK OFFICE
CERTIFICATE OF CORRECTION

PATENT NO. : 4,946,249
DATED : August 7, 1990
INVENTOR(S) : Robert W. Barlow, Thomas M. Lynch, Steven E. Swanson It is certified that error appears in the above-identified patent and that said Letters Patent is hereby corrected as shown below:

Cover page, Item No. [73]:
"GET Products Corporation" should read
---GTE Products Corporation---

Signed and Sealed this

Twentieth Day of August, 1991

Attest:

HARRY F. MANBECK, JR.

*Attesting Officer*         *Commissioner of Patents and Trademarks*